United States Patent [19]

Sarangapani

[11] Patent Number: 6,134,502

[45] Date of Patent: Oct. 17, 2000

[54] ENERGY-BASED APPROACH FOR OBSTACLE AVOIDANCE

[75] Inventor: Jagannathan Sarangapani, Peoria, Ill.

[73] Assignee: Caterpillar Inc., Peoria, Ill.

[21] Appl. No.: 09/201,562

[22] Filed: Nov. 30, 1998

[51] Int. Cl.$^7$ .............................. G06F 9/00; G06N 7/00
[52] U.S. Cl. .................. 701/301; 701/300; 701/302; 701/120; 701/171; 307/9.1
[58] Field of Search ................... 701/301, 302, 701/300, 120, 117; 307/9.1

[56] References Cited

U.S. PATENT DOCUMENTS

| | | | |
|---|---|---|---|
| 5,252,912 | 10/1993 | Merritt et al. | 324/72 |
| 5,961,568 | 10/1999 | Farahat | 701/120 |
| 6,008,546 | 12/1999 | Sage | 307/9.1 |
| 6,049,756 | 4/2000 | Libby | 701/301 |
| 6,061,610 | 5/2000 | Boer | 701/1 |

*Primary Examiner*—Tan Nguyen
*Assistant Examiner*—Ronnie Mancho
*Attorney, Agent, or Firm*—Steve D. Lundquist

[57] ABSTRACT

A method for determining an alternate path by a mobile machine to avoid at least one obstacle. The method includes the steps of assigning an initial value of charge to the mobile machine, assigning a value of charge to a desired destination, determining the presence and the locations of at least one obstacle, and assigning a value of charge to each determined obstacle. The method further includes the steps of determining a force vector equation for each of the desired destination and each obstacle with respect to the mobile machine, determining a resultant force vector as a function of the force vector equations, and controlling the steering and movement of the mobile machine in response to the resultant force vector.

13 Claims, 3 Drawing Sheets

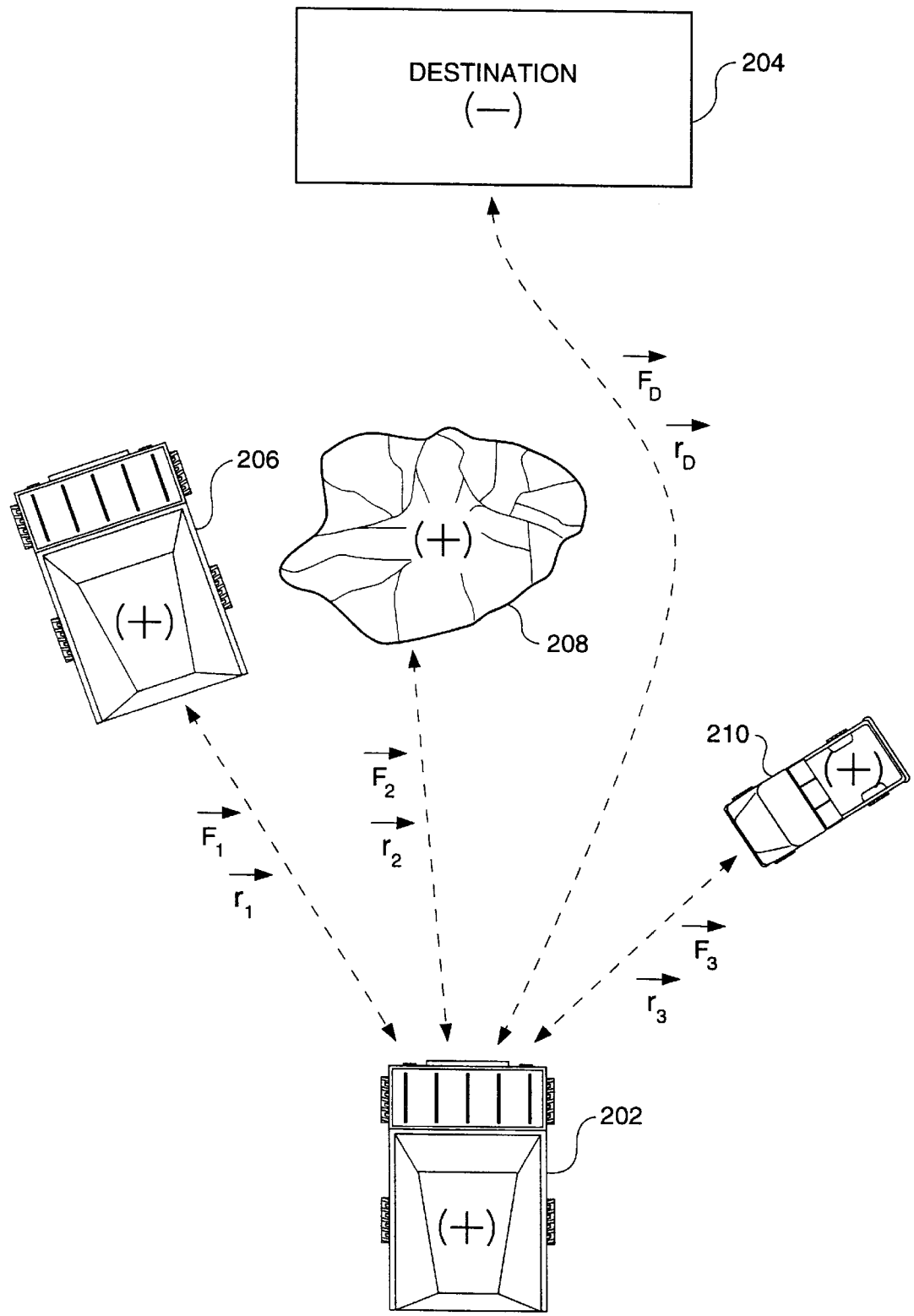

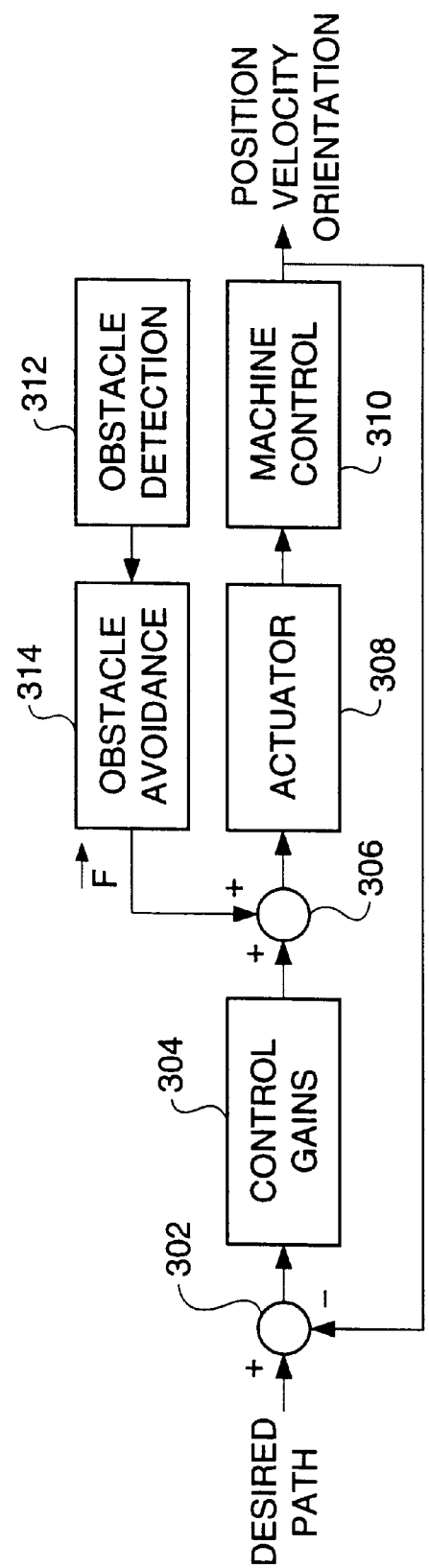
Fig - 3 -

ENERGY-BASED APPROACH FOR OBSTACLE AVOIDANCE

TECHNICAL FIELD

This invention relates generally to a method for avoiding obstacles and, more particularly, to a method for determining avoidance paths around obstacles using energy-based techniques.

BACKGROUND ART

Mobile machines, for example earthworking machines at a mine or construction site, are being developed to be capable of autonomous operation. As an example, a frequent use of autonomous mobile machines involves fleets of autonomous mining trucks for hauling material at a mining site.

One of the principle challenges in the development of autonomous mobile machines is obstacle detection and avoidance. Obstacle avoidance, in particular, offers unique problems in its development. Early versions of obstacle avoidance systems generally consisted of stopping the movement of a mobile machine when an obstacle was detected, only resuming motion when the obstacle was cleared. More advanced versions of obstacle avoidance provided methods for an autonomous mobile machine to determine alternate routes around detected obstacles.

However, as autonomous fleets of mobile machines become more widely used and complex, the task of planning alternate routes to avoid multiple, and often moving, obstacles requires the development of unique and inventive methods to be successful.

The present invention is directed to overcoming one or more of the problems as set forth above.

DISCLOSURE OF THE INVENTION

In one aspect of the present invention a method for determining an alternate path by a mobile machine to avoid at least one obstacle is disclosed. The method includes the steps of assigning an initial value of charge to the mobile machine, assigning a value of charge to a desired destination, determining the presence and the locations of at least one obstacle, and assigning a value of charge to each determined obstacle. The method further includes the steps of determining a force vector equation for each of the desired destination and each obstacle with respect to the mobile machine, determining a resultant force vector as a function of the force vector equations, and controlling the steering and movement of the mobile machine in response to the resultant force vector.

BRIEF DESCRIPTION OF THE DRAWINGS

FIG. 2 is a diagrammatic illustration of force vector relationships of a mobile machine, a desired destination, and a plurality of obstacles; and FIG. 3 is a diagrammatic illustration of a control system as embodied in a preferred aspect of the present invention.

BEST MODE FOR CARRYING OUT THE INVENTION

Figure 1:
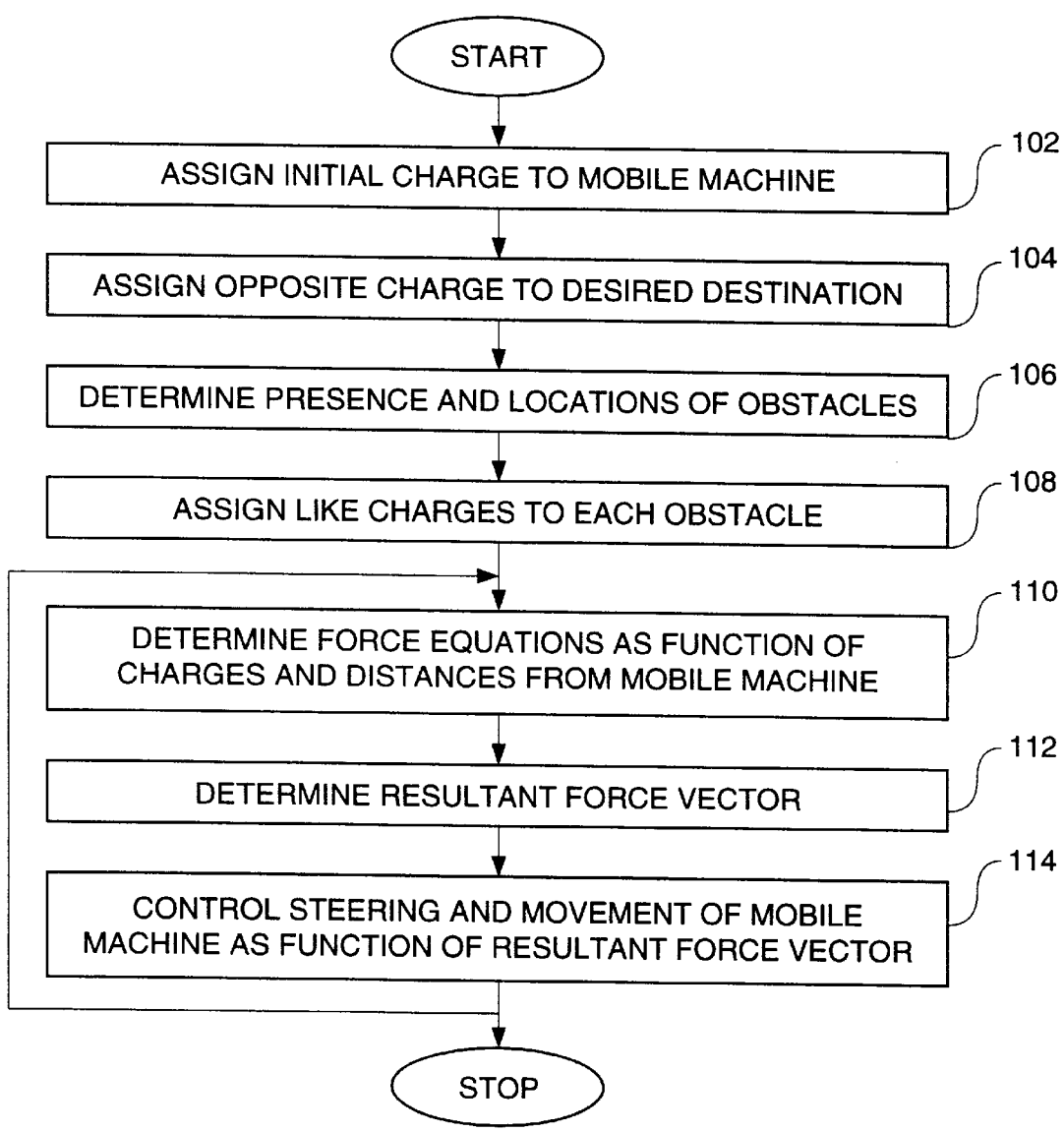
FIG. 1 is a flow diagram illustrating a preferred method of the present invention.

Referring to FIGS. 1, 2, and 3, a method for determining an alternate path by a mobile machine 202 to avoid at least one obstacle is shown. An exemplary mobile machine 202 for use with the present invention is an off-road mining truck for hauling material at a mining site. However, many types of mobile machines, e.g., loaders, scrapers, graders, on-highway trucks, and the like, may benefit from use of the invention.

The present invention is particularly well suited for use in an autonomous mobile machine 202. However, the invention may be equally used in a manual mobile machine situation, perhaps providing a visual output to an operator of a preferred path to traverse to avoid obstacles.

The obstacle avoidance system of the present invention is modeled on a theory of charged particles, and the forces they exert on each other. For example, the theory of charged particles includes two opposite charges, which attract each other in force. Two like charges, on the other hand, oppose each other in force. The charges of attraction and repulsion may be expressed in vector force equations. When multiple charges are present and affected by each other, a resultant force vector of the sum of all charges is easily determined.

As illustrated in FIG. 2, this charge model is easily extended to a mobile machine 202 attempting to reach a desired destination 204. The mobile machine 202 is given a charge (+) and the desired destination 204 is given an opposite charge (−). The resultant force of attraction causes the mobile machine 202 to move toward the desired destination 204. In addition, a plurality of obstacles; for example, a first determined obstacle 206, a second determined obstacle 208, and a third determined obstacle 210, are each given a charge of the same polarity (+) as the charge given to the mobile machine 202. The like charges of the obstacles 206,208,210 create forces of repulsion between the obstacles 206,208,210 and the mobile machine 202.

It is to be understood that the assignment of (+) and (−) charges is purely arbitrary. The designation of polarities is used to help clarify that some charges have forces of attraction and other charges have forces of repulsion.

In FIG. 2, the mobile machine 202 is depicted as an off-road mining truck, the first determined obstacle 206 is depicted as another off-road mining truck, the second determined obstacle 208 is shown as a rock, and the third determined obstacle 210 is shown as a foreman's truck.

Referring to FIG. 1, a flow diagram of a preferred embodiment of the present invention is shown.

In a first control block 102, an initial value of charge is assigned to the mobile machine 202. In a second control block 104, a value of charge is assigned to the desired destination 204, which is of opposite polarity to the initial charge of the mobile machine 202. The two opposite charges therefore create a force of attraction between the mobile machine 202 and the desired destination 204. Hence, the mobile machine 202 attempts to move to the desired destination 204, preferably by a straight line path if no obstacles are detected.

In a third control block 106, the mobile machine 202 determines the presence and locations of any obstacles 206,208,210 which may prevent the mobile machine 202 from moving to the desired destination 204 by the originally intended path. The determination of the presence and the locations of obstacles is well known in the art and will not be discussed further.

Control proceeds to a fourth control block 108, where a value of charge is assigned to each of the obstacles 206, 208,210. Each obstacle charge is of the same polarity as the charge of the mobile machine 202. Therefore, each obstacle 206,208,210 has a force of repulsion against the mobile machine 202.

In the preferred embodiment, the charge on each obstacle 206,208,210 may be given a magnitude value that is a function of certain desired parameters, thus resulting in various levels of force between each obstacle 206,208,210 and the mobile machine 202. For example, the second determined obstacle 208, i.e., the rock, may be assigned with a charge of less magnitude than the charge assigned to the first determined obstacle 206, i.e., the off-road mining truck. This is due to the rock being stationary and predictable, while the off-road mining truck may be moving, thus requiring a larger avoidance distance by the mobile machine 202. Additionally, the first determined obstacle 206 may be assigned a charge of greater magnitude than the third determined obstacle 210, i.e., the foreman's truck, due to the significant difference in the mass of the two machines. Other criteria that may be used to assign a magnitude of charge may be the heading and velocity of a moving obstacle, the level of predictability of the movement of the obstacle, the distance of the obstacle from the mobile machine 202, and the like.

In a fifth control block 110, a force vector equation for each obstacle 206,208,210 with respect to the mobile machine 202, and for the desired destination 204 with respect to the mobile machine 202 is determined. Preferably, each force vector equation is determined as:

$$\vec{F}_i = \frac{K_i(m_i m_{mobilemachine})}{\vec{r}_i^2} \quad \text{(Equation 1)}$$

where:

$\vec{F}_i$ is the force vector between the mobile machine 202 and one of an obstacle 206,208,210 and the desired destination 204;

$K_i$ is a constant;

$m_i$ is the magnitude of charge of an obstacle 206,208,210 or the desired destination 204;

$m_{mobilemachine}$ is the magnitude of charge of the mobile machine 202; and $\vec{r}_i$ is the vector distance from the mobile machine 202 to the obstacle 206,208,210 or the desired destination 204.

In the preferred embodiment, the force vector $\vec{F}_i$ may be correlated with coordinates in the x and y direction and with a steering angle $\Theta$, where the x and y coordinates are two dimensional Cartesian coordinates. However, the force vector $\vec{F}_i$ may correlate to other coordinate systems as well; e.g., site reference systems, polar coordinates, and the like.

Therefore, as is shown in FIG. 2, from the mobile machine 202 to the desired destination 204 is a respective force vector and distance vector $\vec{F}_D,\vec{r}_D$; from the mobile machine 202 to the first determined obstacle 206 is a respective force vector and distance vector $\vec{F}_1,\vec{r}_1$; from the mobile machine 202 to the second determined obstacle 208 is a respective force vector and distance vector $\vec{F}_2,\vec{r}_2$; and from the mobile machine 202 to the third determined obstacle 210 is a respective force vector and distance vector $\vec{F}_3,\vec{r}_3$.

With continued reference to FIG. 3, control proceeds to a sixth control block 112, where a resultant force vector is determined as a function of the force vector equations. In the preferred embodiment, the resultant force vector is determined by:

$$\vec{F}_{resultant} = \sum_{i=1}^{i=n} \vec{F}_i \quad \text{(Equation 2)}$$

In a seventh control block 114, the steering and movement of the mobile machine 202 is controlled as a function of the resultant force vector. The determination of the resultant force vector is a continual process. That is, the fifth, sixth, and seventh control blocks 110,112,114 are repeated continually during movement of the mobile machine 202. In this manner, the resultant force vector continually changes as the conditions between the mobile machine 202, the obstacles 206,208,210, and the desired destination 204 change. From this continual change of the resultant force vector, the path from the mobile machine 202 to the desired destination 204 continually changes to avoid the obstacles 206,208,210 that have been detected.

INDUSTRIAL APPLICABILITY

As an example of an application of the present invention, reference is made to FIG. 3, where a diagrammatic illustration of a preferred embodiment of a control diagram for the present invention is shown.

A command for the mobile machine 202 to traverse a desired path is input to a first summer 302. The first summer 302 also accepts feedback information on the position, velocity, and orientation of the mobile machine 202, thus providing a standard, well known feedback control system. The combined signal is delivered to control gains 304 for further signal processing. A second summer 306 accepts the command signal from the control gains 304, and also accepts the resultant force vector equation from an obstacle avoidance system 314. The obstacle avoidance system 314 receives information about the presence and locations of obstacles from an obstacle detection system 312. The obstacle avoidance system 314 assigns charge magnitudes to the mobile machine 202, the desired destination 204, and each of the obstacles 206,208,210. The obstacle avoidance system 314 then determines force vector equations, determines the resultant force vector, and scales the value of the resultant force vector to be compatible with the signal from the control gains 304.

The signal from the second summer 306, which compensates the original desired path signal to establish a modified path to avoid obstacles, is delivered to an actuator 308 for actuating machine control 310, thus controlling the steering and movement of the mobile machine 202.

Other aspects, objects, and features of the present invention can be obtained from a study of the drawings, the disclosure, and the appended claims.

What is claimed is:

1. A method for determining an alternate path by a mobile machine to avoid at least one obstacle, including the steps of:

a) assigning an initial value of charge to the mobile machine;

b) assigning a value of charge to a desired destination, the charge of the destination being of opposite polarity to the initial charge of the mobile machine;

c) determining the presence and the locations of at least one obstacle;

d) assigning a value of charge to each of the at least one obstacle, each charge being of like polarity to the initial charge of the mobile machine;

e) determining a force vector equation for each of the desired destination and the at least one obstacle with respect to the mobile machine;

f) determining a resultant force vector as a function of the force vector equations; and g) controlling the steering and movement of the mobile machine in response to the resultant force vector.

2. A method, as set forth in claim 1, wherein the initial charge of the mobile machine and the charge of opposite polarity of the desired destination create a force of attraction between each other.

3. A method, as set forth in claim 1, wherein the initial charge of the mobile machine and the charge of each of the at least one obstacle create a force of repulsion between each other.

4. A method, as set forth in claim 1, further including the step of repeating steps e), f), and g) during motion of the mobile machine.

5. A method, as set forth in claim 1, wherein assigning a value of charge to each of the at least one obstacle includes the step of determining a magnitude of each charge as a function of at least one parameter.

6. A method, as set forth in claim 5, wherein a parameter is a determination of an obstacle being one of stationary and in motion.

7. A method, as set forth in claim 5, wherein a parameter is a determination of a characteristic of an obstacle.

8. A method, as set forth in claim 7, wherein a characteristic of an obstacle is the obstacle being a mobile machine.

9. A method, as set forth in claim 8, wherein the characteristic of the obstacle being a mobile machine further includes a characteristic defining a type of mobile machine.

10. A method, as set forth in claim 7, wherein a characteristic of an obstacle is the obstacle being a natural object.

11. A method, as set forth in claim 5, wherein a parameter is a function of at least one of a size, heading, and velocity of an obstacle.

12. A method, as set forth in claim 1, wherein each force vector is determined as a function of the initial charge of the mobile machine, the charge of one of the desired destination and the at least one obstacle, and the distance from the mobile machine to one of the desired destination and the at least one obstacle.

13. A method, as set forth in claim 1, wherein the resultant force vector is determined as the vector summation of each of the force equations.

* * * * *